United States Patent
Cipullo et al.

(10) Patent No.: US 10,480,986 B2
(45) Date of Patent: Nov. 19, 2019

(54) AIRCRAFT FUEL MEASUREMENT

(71) Applicant: AIRBUS OPERATIONS LIMITED, Bristol (GB)

(72) Inventors: Alessio Cipullo, Bristol (GB); Stephen Burnell, Bristol (GB); Joseph K-W Lam, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 509 days.

(21) Appl. No.: 15/189,511

(22) Filed: Jun. 22, 2016

(65) Prior Publication Data
US 2017/0003157 A1 Jan. 5, 2017

(30) Foreign Application Priority Data
Jun. 30, 2015 (GB) .................................. 1511452.3

(51) Int. Cl.
*G01C 3/08* (2006.01)
*G01F 23/292* (2006.01)
*B64D 37/00* (2006.01)
*G01S 17/10* (2006.01)

(52) U.S. Cl.
CPC .......... *G01F 23/292* (2013.01); *B64D 37/005* (2013.01); *G01S 17/10* (2013.01)

(58) Field of Classification Search
CPC ...... G01F 23/292; B64D 37/005; G01S 17/10
See application file for complete search history.

(56) References Cited

U.S. PATENT DOCUMENTS

| | | | |
|---|---|---|---|
| 4,524,282 | A | 6/1985 | King |
| 4,692,023 | A | 9/1987 | Ohtomo et al. |
| 6,715,349 | B2 | 4/2004 | Atkinson |
| 6,782,122 | B1 | 8/2004 | Kline et al. |

(Continued)

FOREIGN PATENT DOCUMENTS

| | | |
|---|---|---|
| DE | 3706453 A1 | 9/1988 |
| DE | 102010062108 A1 | 5/2012 |

(Continued)

OTHER PUBLICATIONS

European Office Action issued in Appln. No. EP 16 173 251.6 dated Apr. 30, 2018.

(Continued)

*Primary Examiner* — Mark Hellner
(74) *Attorney, Agent, or Firm* — Nixon & Vanderhye P.C.

(57) ABSTRACT

A method of estimating a quantity of a liquid fuel in a fuel tank of an aircraft is disclosed. A surface of the fuel is illuminated with light so that the light is reflected or scattered by the surface of the fuel onto an array of sensors. The light travels to and from the surface of the fuel via a measurement path containing a transmission medium. A measured time of flight is made at each sensor for the light which travels via the measurement path to that sensor. At least one of the sensors is illuminated with light via a reference path containing a transmission medium with substantially the same refractive index as the transmission medium in the measurement path, the reference path having a known reference distance which does not vary in accordance with the quantity of the fuel.

9 Claims, 7 Drawing Sheets

(56) References Cited

U.S. PATENT DOCUMENTS

| | | | |
|---|---|---|---|
| 8,159,660 B2* | 4/2012 | Mimeault | G01F 23/292 |
| | | | 356/139.01 |
| 9,921,150 B2* | 3/2018 | Zakrzewski | G01N 21/31 |
| 2004/0119636 A1 | 6/2004 | Edvardsson et al. | |
| 2008/0100501 A1 | 5/2008 | Edvardsson | |
| 2008/0180650 A1 | 7/2008 | Lamesch | |
| 2008/0282817 A1 | 11/2008 | Breed | |
| 2010/0322462 A1 | 12/2010 | Wu et al. | |
| 2012/0013887 A1 | 1/2012 | Xu et al. | |
| 2013/0021610 A1* | 1/2013 | Zettler | G01B 11/255 |
| | | | 356/369 |
| 2015/0109414 A1 | 4/2015 | Adam et al. | |
| 2015/0153212 A1* | 6/2015 | Cipullo | G01F 23/292 |
| | | | 382/203 |
| 2016/0097844 A1 | 4/2016 | Takano | |
| 2017/0227454 A1* | 8/2017 | Zakrzewski | G01N 21/31 |

FOREIGN PATENT DOCUMENTS

| | | | |
|---|---|---|---|
| EP | 2 770 308 | | 8/2014 |
| EP | 2770308 | A1 | 8/2014 |
| JP | S55146015 | A | 11/1980 |
| WO | 8303135 | A1 | 9/1983 |
| WO | 2006097406 | A2 | 9/2006 |
| WO | 2011000815 | A1 | 1/2011 |
| WO | 2014090848 | | 6/2014 |
| WO | 2014208018 | A1 | 12/2014 |

OTHER PUBLICATIONS

European Search Report dated Nov. 22, 2016 EP Application No. 16173251.

UKIPO Search Report dated Nov. 27, 2015 Great Britain Application No. 1511452.3.

English translation of Notification of the First Office Action for Chinese Application No. 201610460784.5, 13 pages, dated May 22, 2019.

* cited by examiner

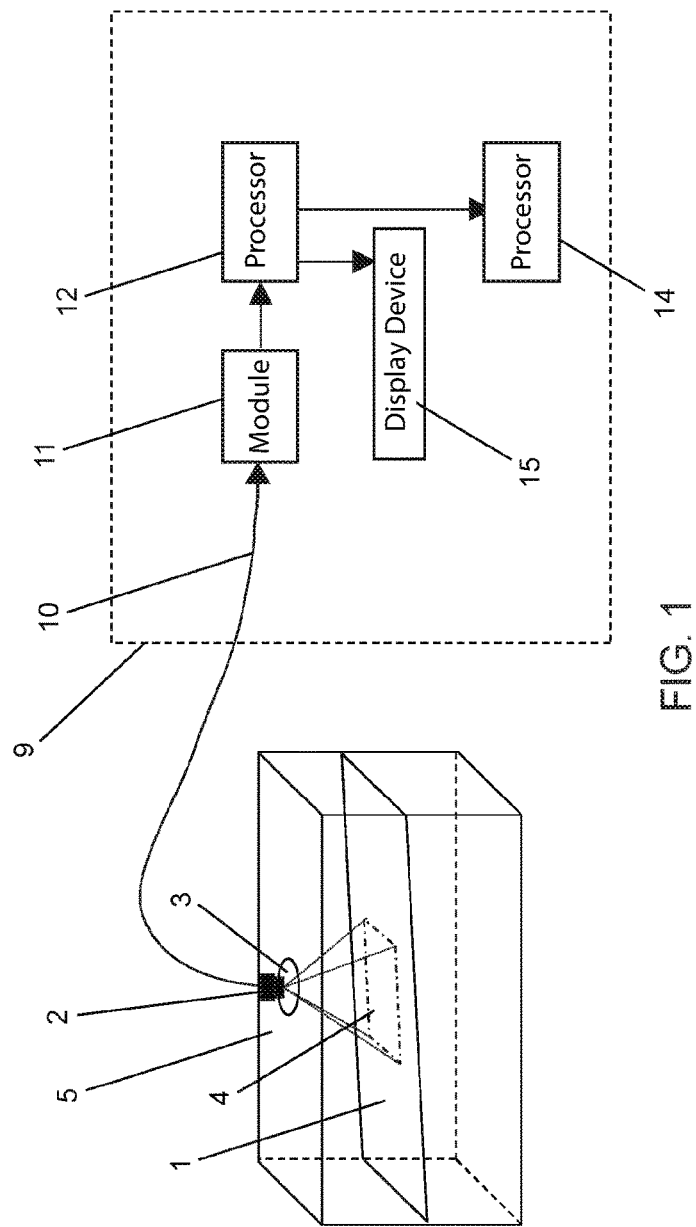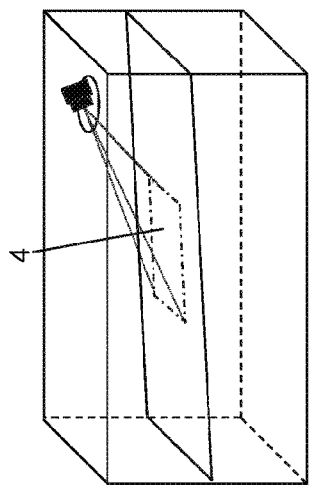

020
AIRCRAFT FUEL MEASUREMENT

RELATED APPLICATIONS

The present application claims priority from Great Britain Application Number 1511452.3, filed Jun. 30, 2015, the disclosure of which is hereby incorporated by reference herein in its entirety.

FIELD OF THE INVENTION

The present invention relates to a method of estimating a quantity of a liquid fuel in a fuel tank of an aircraft, and related apparatus.

BACKGROUND OF THE INVENTION

US2015/0153212 discloses a method of measuring a height of a fuel surface of fuel in an aircraft fuel tank. One or more images of the fuel surface are captured, each image including a fuel surface line where the fuel surface meets a structure. Each image is analysed in order to determine a height of the fuel surface line at three or more points in the image. If the fuel surface line is not a straight line, then an average angle of the fuel surface line can be determined from the points in the image by spatial averaging. Preferably a series of images of the fuel surface are captured over a time period, and an average height of the fuel surface is determined from the series of images by time averaging. The height of the fuel surface line(s) at three or more points is used to determine a volume of the fuel, a mass of the fuel, and/or an attitude of the fuel surface.

A Time-of-Flight Camera (ToF Camera) is a range imaging camera system that resolves distance based on the known speed of light. A ToF Camera is based on the laser rangefinder principle: a very short laser pulse is sent against a target and the time-of-flight (i.e. the time the laser pulse takes to be reflected and to come back to the receiver) is measured. Knowing the speed of propagation of the light the distance can be resolved.

A ToF Camera is a 3D version of a laser rangefinder, where the receiver is a matrix of pixels, and each pixel is able to measure the time-of-flight for the emitted light/laser pulse reflected by a specific region of a 3D object. The final result is a 3D map (or distance map) of the real 3D object. There are typically no moving parts within the ToF Camera and a 3D map of an object can be done in a single measurement. Acquisition rates of 50-60 Hz have been achieved with commercial systems.

A 3-D imaging system is described in WO2006/097406. A photodiode or sensor cell are placed in an illumination unit. The sensor cell provides a phase reference essentially corresponding to a zero distance measurement.

SUMMARY OF THE INVENTION

A first aspect of the invention provides an aircraft fuel tank system comprising: a fuel tank; an array of sensors; a light source arranged to illuminate a surface of a liquid fuel in the fuel tank with light so that the light is reflected or scattered by the surface of the fuel onto an array of sensors, the light travelling to and from the surface of the fuel via a measurement path containing a transmission medium, wherein the light source is also arranged to illuminate at least one sensor of the array of sensors with light via a reference path containing a transmission medium with substantially the same refractive index as the transmission medium in the measurement path, the reference path having a known reference distance which does not vary in accordance with the quantity of the fuel; and a processing system arranged to determine a measured time of flight of the light which travels via the measurement path to each sensor of the array of sensors, measure a reference time of flight of the light which travels via the reference path to said at least one sensor, and estimate the quantity of the fuel in the fuel tank in accordance with the measured times of flight, the reference time of flight and the known reference distance.

Thus, the light may be reflected or scattered by the surface of the fuel onto the array of sensors such that each sensor of the array of sensors receives reflected light from a respective location of a plurality of locations on the surface of the fuel, and the processing system may be arranged to determine a measured time of flight of the light which travels via the measurement path to each sensor of the array of sensors to thereby determine a measured time of flight for each respective location of the plurality of locations on the surface of the fuel.

A further aspect of the invention provides a method of estimating a quantity of a liquid fuel in a fuel tank of an aircraft, the method comprising: illuminating a surface of the fuel with light so that the light is reflected or scattered by the surface of the fuel onto an array of sensors, the light travelling to and from the surface of the fuel via a measurement path containing a transmission medium; for each sensor of the array of sensors, determining a measured time of flight of the light which travels via the measurement path to that sensor, illuminating at least one sensor of the array of sensors with light via a reference path containing a transmission medium with substantially the same refractive index as the transmission medium in the measurement path, the reference path having a known reference distance which does not vary in accordance with the quantity of the fuel; measuring a reference time of flight of the light which travels via the reference path to said at least one sensor; and estimating the quantity of the fuel in the fuel tank in accordance with the measured times of flight, the reference time of flight and the known reference distance.

The light may be in the visible, ultraviolet or infrared part of the spectrum.

The light travelling via the reference path may be reflected or scattered onto said at least one sensor by a fixed structure such as a wall of the fuel tank. Optionally the system further comprises a reflector which is mounted in fixed relation to the array of sensors, so that the light travelling via the reference path is reflected onto said at least sensor by the reflector. The reflector may be a semi-transparent window arranged such that some of the light from the light source is transmitted through the semi-transparent window and illuminates the surface of the fuel, and some of the light from the light source is reflected by the window onto said at least one sensor.

Optionally the light source is arranged for pulsed operation so that the light which illuminates the surface of the liquid fuel in the fuel tank is emitted by the light source in pulses. In this case the system may directly measure the time of flight, or may indirectly measure the time of flight by using a range gated imager with a shutter in front of the sensor array that opens and closes at the same rate as the light pulses are sent out. Part of every returning pulse is blocked by the shutter according to its time of arrival, so the amount of light received relates to the time of flight.

Alternatively the light source may be arranged for continuous operation so that the light which illuminates the surface of the liquid fuel in the fuel tank is emitted continuously by the light source. For example the light may be modulated with an RF carrier, and the phase shift of that carrier measured at the sensor array to infer the time of flight.

The surface of the fuel may be illuminated from above so that the transmission medium in the measurement path comprises ullage gas, or from below so that the transmission medium in the measurement path comprises the liquid fuel.

Optionally a lens is arranged so that the light travelling to and from the surface of the fuel via the measurement path passes through the lens. The lens may be arranged so that the light travelling to said at least one sensor via the reference path also passes through the lens.

BRIEF DESCRIPTION OF THE DRAWINGS

Embodiments of the invention will now be described with reference to the accompanying drawings, in which:

FIG. 1 shows an aircraft fuel tank and a time-of-flight based system for measuring a surface of fuel in the tank;

FIG. 2 shows an alternative field of view for the camera;

DETAILED DESCRIPTION OF EMBODIMENT(S)

Figure 3:
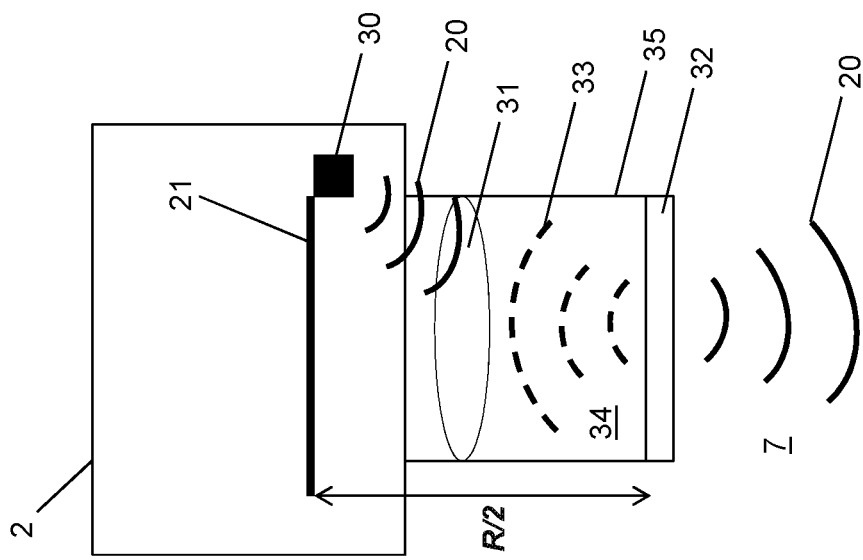
FIG. 3 shows the principle of operation of the camera.

FIG. 1 is a schematic view of an aircraft fuel tank system comprising a fuel tank, and apparatus for measuring a surface 1 of fuel in the fuel tank. A time-of-flight camera 2 can view into the fuel tank through an optical access window 3 in a top wall 5 of the fuel tank, in a position where the wall 5 is not normally covered in fuel. The window 3 has hydrophobic coatings to minimise problems with condensation, fog, frost and microbial growth. The camera 2 can acquire and digitise images of a field of view 4. These images are transmitted to an acquisition and conditioning module 11 of an image acquisition and elaboration section 9 via an electrical harness 10.

The fuel tank is shown schematically with a parallelepiped structure with front and rear walls, left and right side walls, a bottom wall and a top wall. In FIG. 1 the camera 2 is positioned centrally and pointed directly down towards the fuel surface 1. In FIG. 2 to the camera is positioned to one side of the tank and pointed towards the fuel surface 1 at an oblique angle.

The wide field of view 4 of the camera creates image distortion. An image elaboration (correction) processor 12 applies a predetermined correction coefficient matrix to the images in order to correct for this distortion.

The corrected images can then be output to a display device 15 for display to a pilot of the aircraft during flight of the aircraft, or to ground crew during refuel and ground operations.

Figure 4:
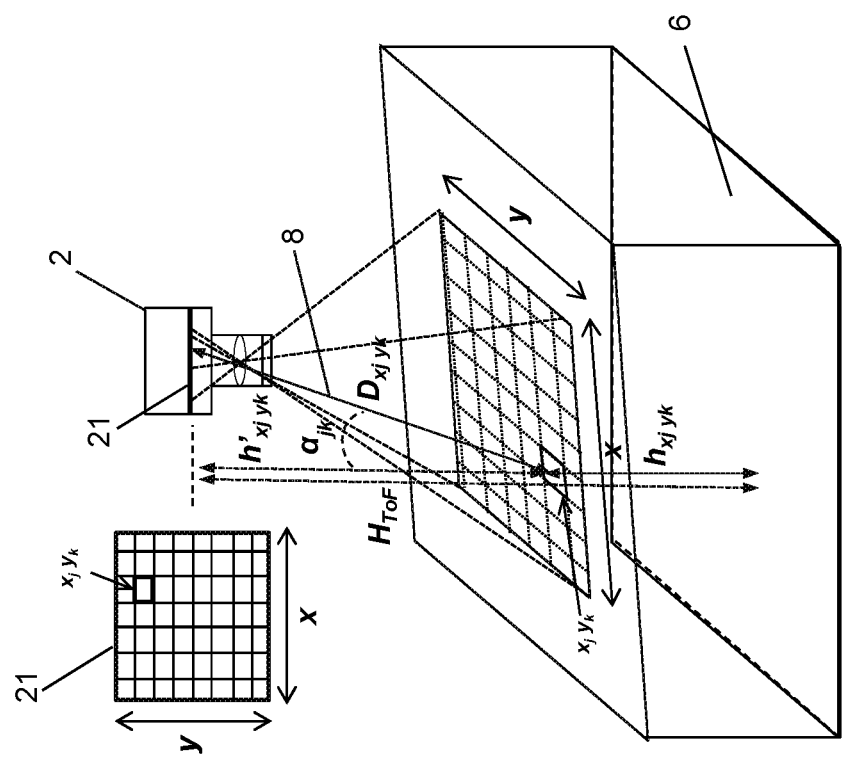
FIG. 4 shows the camera in detail.

The operation of the camera 2 is shown in FIGS. 3 and 4. A measurement pulse 20 of visible light is sent from the camera 2 towards the fuel surface 1. The measurement pulse 20 is reflected and/or scattered by the fuel surface 1 and received by an array 21 of sensor pixels $x_j\ y_k$. Each sensor pixel of the array 21 of sensors measures a distance from a respective location of the fuel surface 1. So in FIG. 3 a sensor pixel at position $x_j\ y_k$ in the array 21 is shown measuring a distance $D_{xj\ yk}$ to a corresponding location on the fuel surface 1 which is also labelled $x_j\ y_k$. Knowing the distance of the camera 2 from the bottom 6 of the tank it is therefore possible to measure a fuel height $h_{xj\ yk}$ at the location $x_j\ y_k$.

The same procedure can be applied to all other sensor pixels, and the fuel height for each point of the fuel surface 1 in the field of view of the camera 2 measured. This makes it possible to measure the quantity of fuel in the tank, knowing the tank geometry. The fuel heights can also be used to determine the attitude of the fuel surface 1, and/or to detect contaminants floating on the fuel surface.

The distance $D_{xj\ yk}$ can be measured applying the formula: $D_{xj\ yk}=ct_{xj\ yk}/2$, where c is the speed of light in the measurement path (in this case the ullage above the fuel surface 1) and $t_{xj\ yk}$ is the measured time-of-flight for the measurement pulse 20 to be reflected from the fuel surface 1 at location $x_j\ y_k$ and recorded by the sensor pixel $x_j\ y_k$.

The fuel heights $h_{xj\ yk}$ are then $h_{xj\ yk}=H_{ToF}-h'_{xj\ yk}=H_{ToF}-D_{xj\ yk}\cos\alpha_{jk}$ where angle $\alpha_{jk}$ is known from the optics of the camera 2, distance $H_{ToF}$ is the known distance from the array 21 to the bottom 6 of the tank, and height $h'_{xj\ yk}$ is the height from the location $x_j\ y_k$ on the fuel surface to the array 21.

FIG. 4 shows the camera 2 in detail. A light source 30 such as a laser generates pulses of light which are directed into a lens 31. Some of the light is transmitted through a semi-transparent window 32 to provide the measurement pulse 20 which illuminates the fuel surface 1. Some of the light is reflected by the window 32 to provide a reference pulse 33 which is directed onto the sensor array 21 by the lens 31 without having been reflected by the fuel. The window 32 is mounted in fixed relation to the sensor array 21 by a support 35 so that they are spaced apart by a known distance R/2 which does not vary in accordance with the quantity of the liquid in the fuel tank.

The measurement pulse 20 travels to and from the fuel surface 1 via a measurement path 8 containing a transmission medium. This transmission medium is principally the air in an ullage 7 above the fuel surface 1. The distance of this measurement path varies in accordance with the quantity of fuel in the tank. The reference pulse 33 on the other hand travels from the light source 30 to the sensor array 21 via a reference path having a known reference distance R which does not vary in accordance with the quantity of fuel in the tank. The space 34 between the lens 31 and the window 32 contains the same transmission medium as the measurement path (in this case the air in the ullage 7) at approximately the same temperature and pressure. This ensures that the reference path contains a transmission medium with substantially the same refractive index as the transmission medium in the measurement path, and hence substantially the same speed of light in the medium.

As described above, the camera 2 determines a measured time of flight of the measurement pulse 20 via the measurement path for each sensor in the array. This time-of-flight measurement is dependent on the speed of light c in the measurement path, which varies in accordance with the refractive index of the transmission medium in the measurement path (as determined by its temperature, density and material composition). The camera 2 measures a reference time of flight of the reference pulse 33 via the reference path to at least one sensor pixel in the array 21, and corrects the estimate of the quantity of fuel in accordance with this reference time of flight. Specifically, a speed of light $c_R$ is used to measure the time of flight to and from the fuel surface 1, where $c_R=R/t_R$, $t_R$ is the reference time of flight for the reference pulse 33, and R is the known reference distance.

An estimation of the fuel surface heights $h_{xj\ yk}$ at the various locations within the field of view 4 are then determined by a processor 14 based on the algorithm previously mentioned: $h_{xj\ yk}=H_{ToF}-h'_{xj\ yk}=H_{ToF}-D_{xj\ yk}\cdot\cos\alpha_{jk}$. These fuel surface heights $h_{xj\ yk}$ are then used by the processor 14 to determine the attitude of the fuel surface 1 along with the quantity of fuel in the tank (mass and/or volume) based on the known geometry of the tank.

Figure 5:
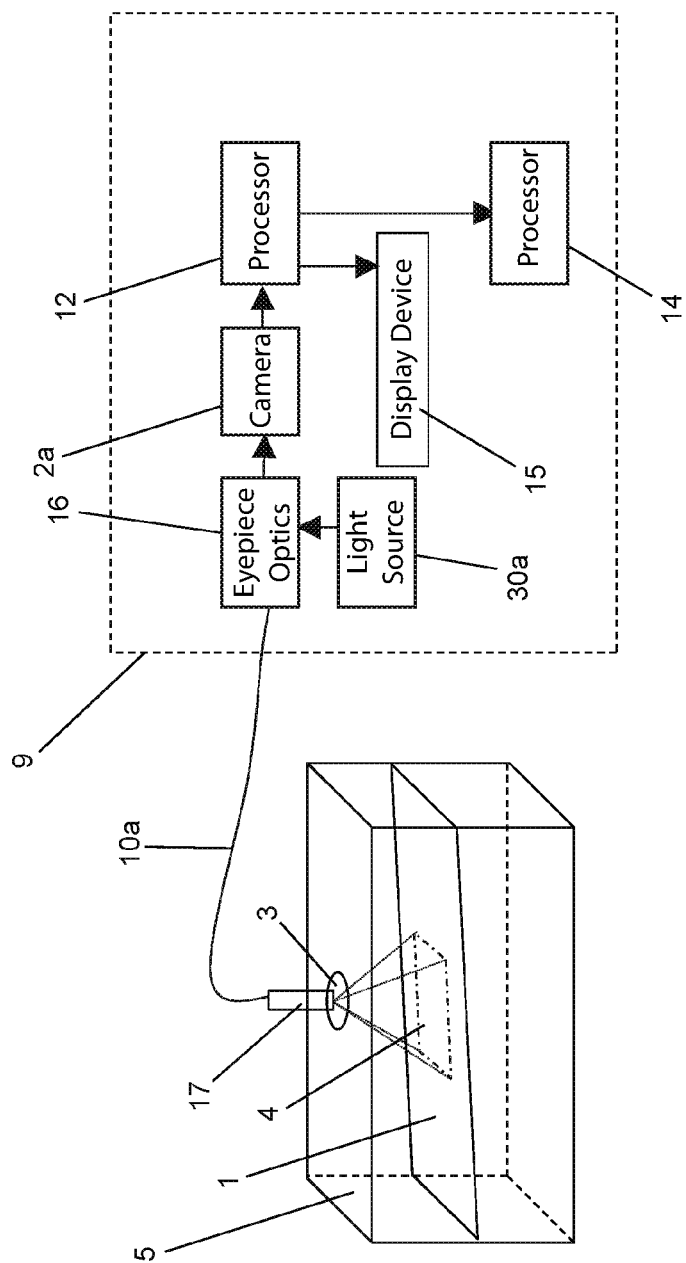
FIG. 5 shows an alternative system employing optical fibre.

FIG. 5 is an alternative embodiment with an optical-fibre based image acquisition system in which the camera is located remotely. A light source 30a directs light into an optical fibre bundle 10a via eyepiece optics 16. The light is then directed into the fuel tank by a fibrescope 17. Reflected light is received by the fibrescope 17 which it transmits to a time-of-flight camera 2a via the optical fibre bundle 10a and eyepiece optics 16. In this case the reference path is integrated into the fibrescope 17 at the end of the optical fibre bundle 10a.

Figure 6:
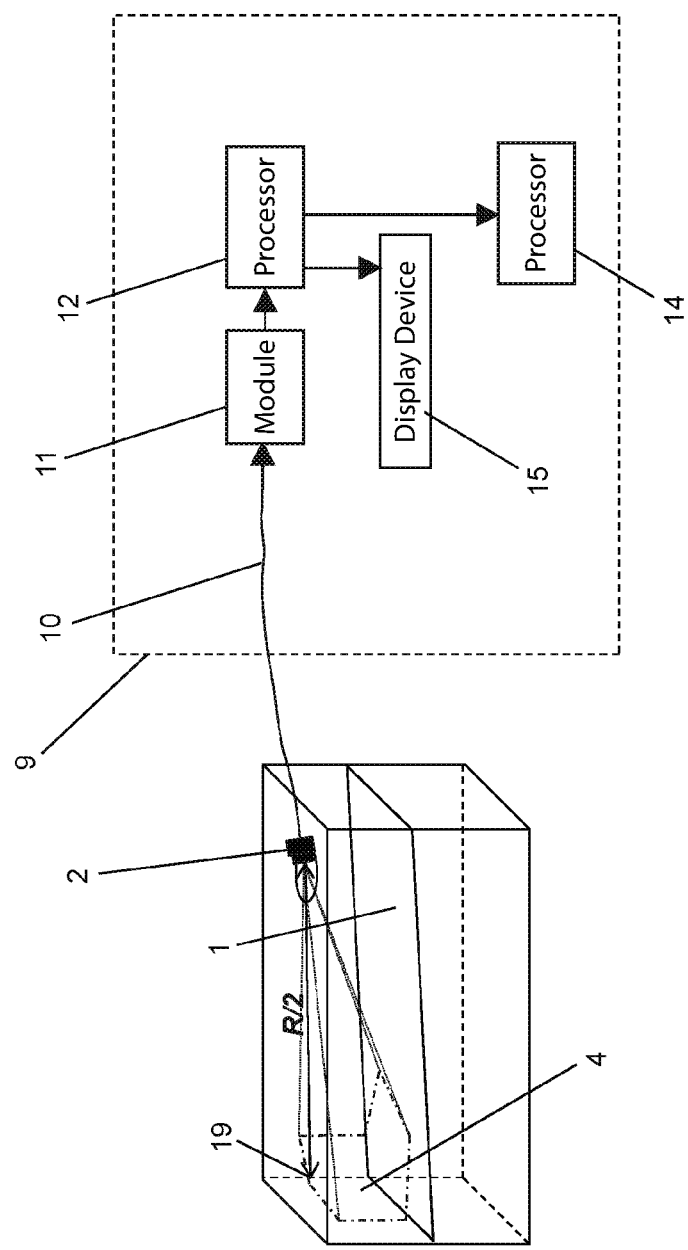
FIG. 6 shows a system in which the field of view of the camera includes the fuel tank wall.

FIG. 6 is an alternative embodiment in which the camera's field of view 4 includes not only the surface 1 of the fuel but also two side walls of the fuel tank which meet at a corner. This enables the time-of-flight camera 2 to measure the height of the fuel surface 1, and also the height of the interface where the fuel surface 1 meets the two side walls. The camera 2 in FIG. 6 may be replaced by a fibrescope 17 and remote camera 2a as in FIG. 5.

A preset location 19 at the top of the field of view 4 where it meets the corner of the fuel tank can be used to provide a reference path with a relatively long known reference distance R, instead of using a relatively short reference path within the camera as shown in FIG. 4. This preset location 19 is at a known and fixed distance R/2 from the camera, and is imaged by one of the sensor pixels. The associated reference time of flight to and from that location 19 is used to determine the speed of light in the ullage.

Figure 7:
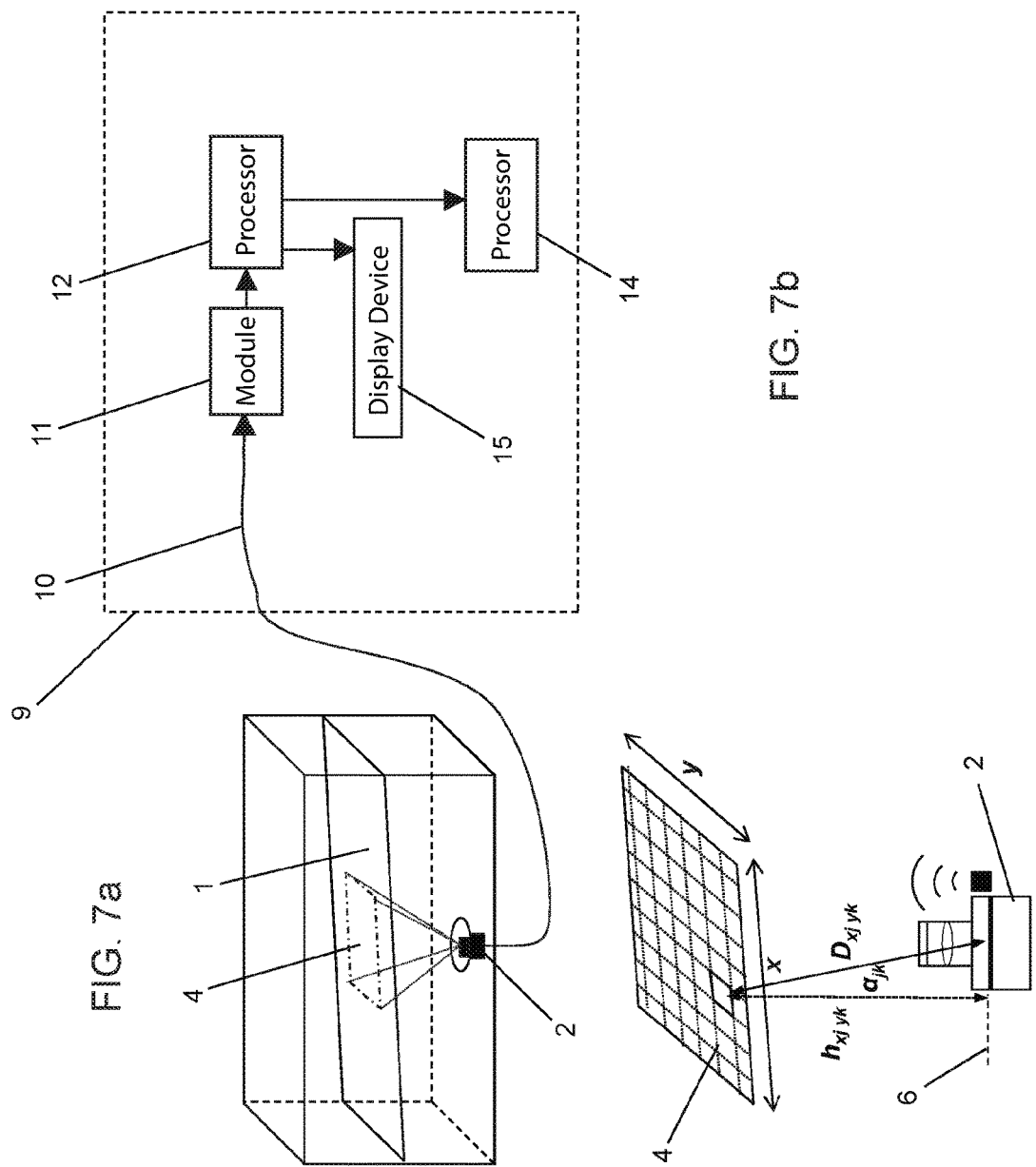
FIGS. 7a and 7b show a system in which the camera views the fuel surface from below.

FIGS. 7a and 7b show an alternative embodiment in which the camera 2 is mounted to the bottom wall 6 of the fuel tank and views the fuel surface 1 from below through the liquid fuel. In this case the space 34 between the lens 31 and window 32 in the camera, which provides the reference path for measurement of the speed of light in the medium, is flooded with liquid fuel at approximately the same temperature as the fuel in the tank. This may be achieved by leaving an open passage through the support 35 and into the reference path, and immersing the camera 2 in the fuel so that fuel flows through the open passage and into the reference path. Alternatively the reference path may be sealed and contain fuel of the same type that is in the fuel tank. The algorithm to measure the fuel height is similar to the one described above, in this case: $h_{xj\ yk}=D_{xj\ yk}\cdot\cos\alpha_{jk}$.

To summarize the embodiments of the invention described above, a light source 30, 30a is arranged to illuminate a surface 1 of liquid fuel in the fuel tank with light so that the light is reflected or scattered by the surface 1 onto an array 21 of sensors. The light travels to and from the surface 1 via a measurement path containing a transmission medium (ullage gas or liquid fuel for example). The light source is also arranged to illuminate at least one sensor of the array 21 of sensor with light via a reference path containing a transmission medium with substantially the same refractive index as the transmission medium in the measurement path. The reference path has a known reference distance R which does not vary in accordance with the quantity of the fuel. A processing system is arranged to determine a measured time of flight $t_{xj\ yk}$ of the light which travels via the measurement path to each sensor of the array 21 of sensors. The processing system is also arranged to measure a reference time of flight $t_R$ of the light which travels via the reference path to said at least one sensor of the array 21 of sensors. The processing system estimates the quantity of the fuel in the fuel tank in accordance with the measured times of flight $t_{xj\ yk}$, the reference time of flight $t_R$ and the known reference distance R. More specifically, distances $D_{xj\ yk}$ are determined in accordance with the measured times of flight $t_{xj\ yk}$, the reference time of flight $t_R$ and the known reference distance R as: $D_{xj\ yk}=R\cdot t_{xj\ yk}/2\cdot t_R$. These distances $D_{xj\ yk}$ are used to determine heights of the fuel surface $h_{xj\ yk}=H_{ToF}-h'_{xj\ yk}=H_{ToF}-D_{xj\ yk}\cdot\cos\alpha_{jk}$. The heights $h_{xj\ yk}$ of the fuel surface 1 are used to estimate the quantity of the fuel in the fuel tank based on the known geometry of the tank. The processing system may be a single processing unit 14 or a more distributed processing system—some of the processing system being housed in the camera 2, 2a for example.

Figure 8:
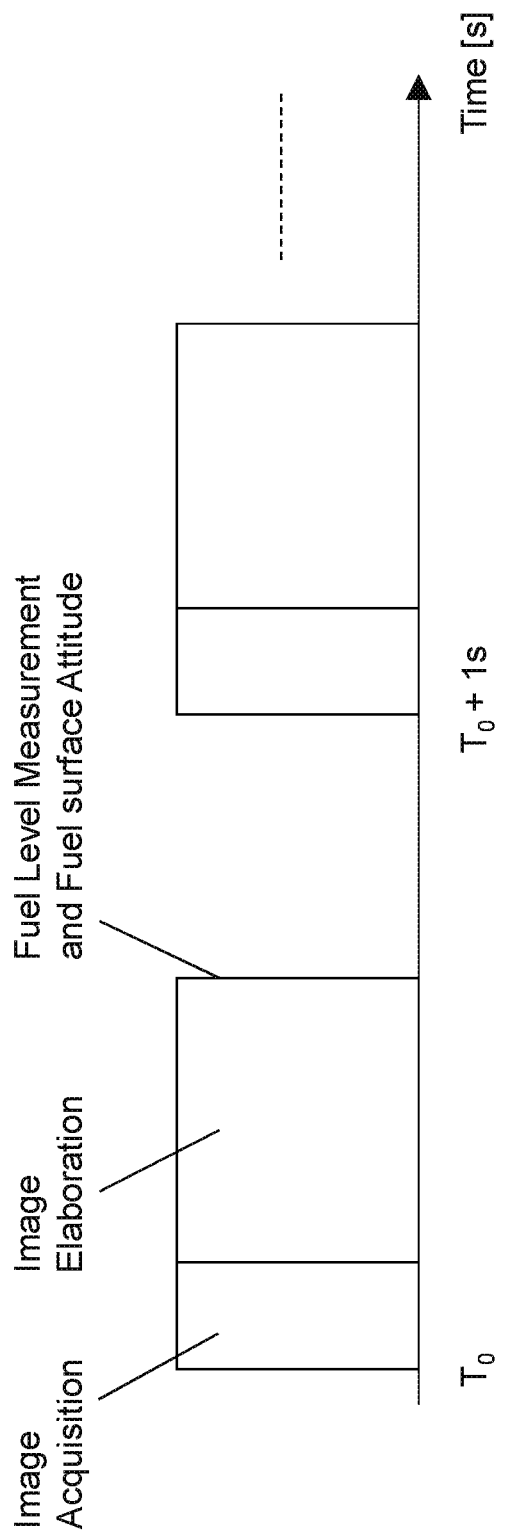
FIG. 8 shows a process for making a series of measurements.

The image acquisition and elaboration must be performed in real-time to allow a refresh time of the fuel quantity indication of 1 s (1 Hz refresh rate) minimum as illustrated in FIG. 8. To allow this, a Digital Signal Processor (DSP) or similar high performance processors might be used for elements 11, 12 and 14 in FIG. 1. FIG. 8 shows two measurement cycles spaced apart by 1 s.

During the image acquisition phase of each cycle, a single measurement pulse is sent out and the reflected light is sensed at all pixels of the sensor array. During an image elaboration phase of each cycle the time-of-flight measurements are calculated and processed to provide an image of the field of view of the camera, and from that to determine a height and attitude of the fuel surface, and hence to estimate a quantity of the liquid fuel in the fuel tank. A calibration measurement of the speed of light $c_R$ in the transmission medium is made once per cycle. Each measurement of $c_R$ is used to correct the measured distance from the fuel surface (and hence estimate the quantity of liquid fuel) for that cycle.

Figure 9:
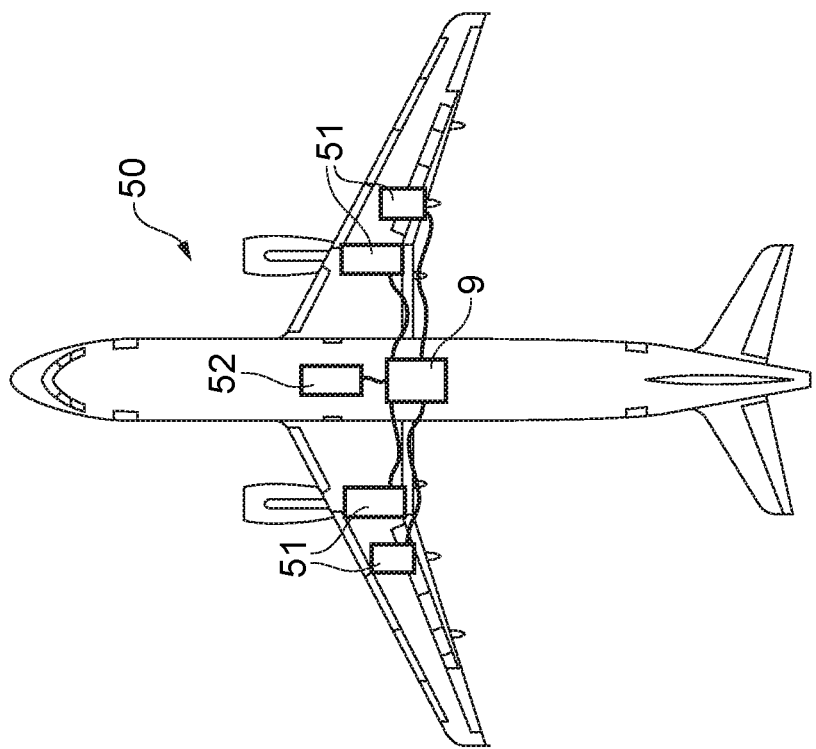
FIG. 9 shows an aircraft with a centralised processing architecture for monitoring fuel.

FIG. 9 is a plan view of an aircraft 50 incorporating the system of FIG. 1. The aircraft has a wing fuel tank in each wing, and a centre fuel tank under the fuselage. Each fuel tank is divided into a number of bays, each bay being separate from an adjacent bay by a rib which has holes allowing fuel to move between the adjacent bays. FIG. 9 shows two bays 51 of each wing fuel tank and a single bay 52 of the centre fuel tank. Each one of the five bays has a time-of-flight camera installed as shown in FIG. 1. In the architecture of FIG. 9 each electrical harness 10 or optical fibre bundle 10a leads to a single centralised image elaboration and elaboration section 9 in a pressurised and conditioned area.

Figure 10:
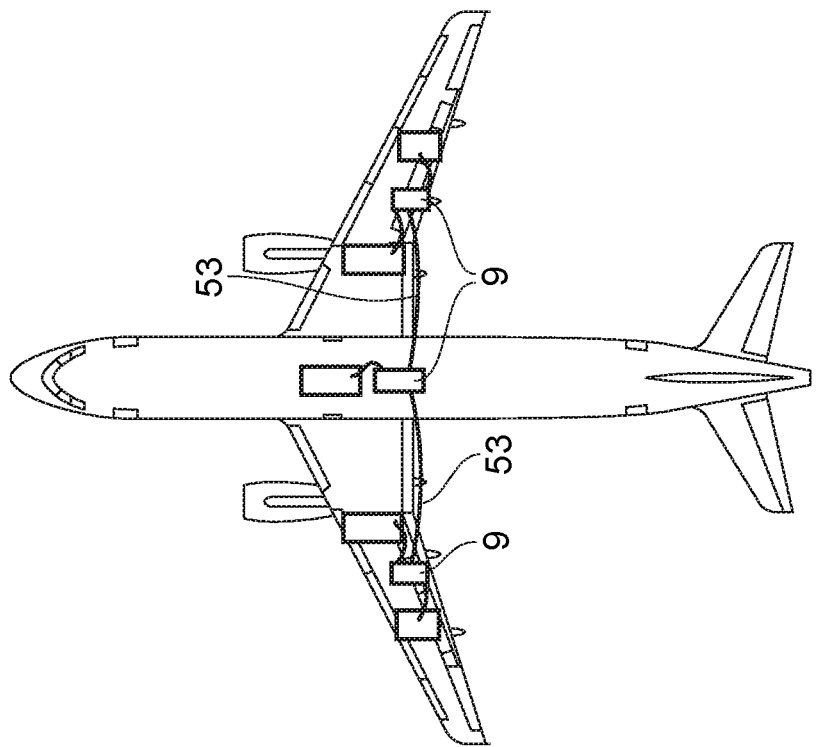
FIG. 10 shows an aircraft with a distributed processing architecture for monitoring fuel.

FIG. 10 shows an alternative localised architecture in which three image elaboration and elaboration sections 9 are provided closer to the bays thus reducing the length of electrical harness required. The elaborated data may be transferred to a central one of the sections 9 via an electrical or optical communication network 53.

In the embodiments described above, the time-of-flight camera 2 is a direct time-of-flight camera which measures the direct time-of-flight required for a laser pulse to leave the camera and reflect back onto the sensor array. In other embodiments of the invention, other forms of time-of-flight camera may be used. For example the time-of-flight camera may use an RF-modulated light source and a phase detector. The outgoing beam is continuous (rather than pulsed) and modulated with an RF carrier, and the phase shift of that carrier is measured on the receiver side. Alternatively the time-of-flight camera may be a range gated imager with a shutter in front of the sensor array that opens and closes at the same rate as the light pulses are sent out. Part of every returning pulse is blocked by the shutter according to its time of arrival, so the amount of light received relates to the time of flight.

Although the invention has been described above with reference to one or more preferred embodiments, it will be appreciated that various changes or modifications may be made without departing from the scope of the invention as defined in the appended claims.

The invention claimed is:

1. An aircraft fuel tank system, comprising:
   a fuel tank;
   an array of sensors;
   a light source arranged to illuminate a surface of a liquid fuel in the fuel tank with light so that the light is reflected or scattered by the surface of the fuel onto the array of sensors, the light travelling to and from the surface of the fuel via a measurement path containing a transmission medium, wherein the light source is also arranged to illuminate at least one sensor of the array of sensors with light via a reference path containing a transmission medium with substantially the same refractive index as the transmission medium in the measurement path, the reference path having a known reference distance which does not vary in accordance with the quantity of the fuel; and
   a processing system arranged to determine a measured time of flight of the light which travels via the measurement path to each sensor of the array of sensors, measure a reference time of flight of the light which travels via the reference path to said at least one sensor, and estimate the quantity of the fuel in the fuel tank in accordance with the measured times of flight, the reference time of flight and the known reference distance,
   a reflector mounted in fixed relation to the array of sensors, so that the light travelling via the reference path is reflected onto said at least one sensor by the reflector,
   wherein the reflector is a semi-transparent window arranged such that some of the light from the light source is transmitted through the semi-transparent window and illuminates the surface of the fuel to provide the measurement path, and some of the light from the light source is reflected by the semi-transparent window onto said at least one sensor to provide the reference path.

2. A system according to claim 1, wherein the light source is arranged for pulsed operation so that the light which illuminates the surface of the liquid fuel in the fuel tank is emitted by the light source in pulses.

3. A system according to claim 1, wherein the surface of the fuel is illuminated from above so that the transmission medium in the measurement path comprises tillage gas.

4. A system according to claim 1, wherein the surface of the fuel is illuminated from below so that the transmission medium in the measurement path comprises the liquid fuel.

5. A system according to claim 1, further comprising a lens arranged so that the light travelling to and from the surface of the fuel via the measurement path passes through the lens.

6. A system according to claim 5 wherein the lens is arranged so that the light travelling to said at least one sensor via the reference path also passes through the lens.

7. A system according to claim 1, wherein the processing system is arranged to estimate the quantity of the fuel in the fuel tank in accordance with the measured times of flight, the reference time of flight, the known reference distance, and a known geometry of the fuel tank.

8. An aircraft comprising a fuel tank system according to claim 1.

9. A method of estimating a quantity of a liquid fuel in a fuel tank of an aircraft, the method comprising:
   illuminating a surface of the fuel with light so that the light is reflected or scattered by the surface of the fuel onto an array of sensors, the light travelling to and from the surface of the fuel via a measurement path containing a transmission medium;
   for each sensor of the array of sensors, determining a measured time of flight of the light which travels via the measurement path to that sensor;
   illuminating at least one sensor of the array of sensors with light via a reference path containing a transmission medium with substantially the same refractive index as the transmission medium in the measurement path, the reference path having a known reference distance which does not vary in accordance with the quantity of the fuel;
   measuring a reference time of flight of the light which travels via the reference path to said at least one sensor;
   estimating the quantity of the fuel in the fuel tank in accordance with the measured times of flight, the reference time of flight and the known reference distance;
   providing a reflector mounted in fixed relation to the array of sensors, so that the light travelling via the reference path is reflected onto said at least one sensor by the reflector,
   wherein the reflector is a semi-transparent window arranged such that some of the light from the light source is transmitted through the semi-transparent window and illuminates the surface of the fuel to provide the measurement path, and some of the light from the light source is reflected by the semi-transparent window onto said at least one sensor to provide the reference path.

* * * * *